United States Patent [19]
Catelli

[11] Patent Number: 4,721,627
[45] Date of Patent: Jan. 26, 1988

[54] PROCESS FOR REFINING FOODSTUFFS

[75] Inventor: Camillo Catelli, Parma, Italy

[73] Assignee: Rossi & Catelli S.p.A., Parma, Italy

[21] Appl. No.: 823,769

[22] Filed: Jan. 29, 1986

[30] Foreign Application Priority Data

Apr. 24, 1985 [IT] Italy .................. 40042 A/85

[51] Int. Cl.⁴ .............................. A23P 1/00
[52] U.S. Cl. .................. 426/478; 426/482; 426/484; 241/DIG. 14
[58] Field of Search ............. 426/478, 518, 482, 484, 426/489; 241/DIG. 14

[56] References Cited
U.S. PATENT DOCUMENTS

| | | | |
|---|---|---|---|
| 1,099,557 | 6/1914 | Merritt | 426/518 |
| 1,793,098 | 2/1931 | Kramer | 241/DIG. 14 |
| 1,977,098 | 10/1934 | Thal | 241/DIG. 14 |
| 2,677,504 | 5/1954 | Klingel | 214/DIG. 14 |

FOREIGN PATENT DOCUMENTS

2744950 4/1979 Fed. Rep. of Germany ...... 426/489

*Primary Examiner*—George Yeung
*Attorney, Agent, or Firm*—Karen M. Gerken; Martin P. Hoffman; Mitchell B. Wasson

[57] ABSTRACT

The invention relates to a process for refining foodstuffs, and to plant for the implementation of such a process. The basic process is one in which foodstuff is fed into a depressurized environment and refined therein, whereupon the refined end-product, and any waste matter separated during the process, are both drawn off. Plant for the purpose substantially comprises an environment in which a vacuum is created and maintained, such as will house conventional types of machinery which refine the foodstuff, separate any waste matter, and collect the end-product which is then drawn off by a pump. Such a process and plant serve in particular for extracting juice and purée from fruit, vegetable, and market garden produce in general, as well as for reducing meat of all kinds to a paste.

4 Claims, 1 Drawing Figure

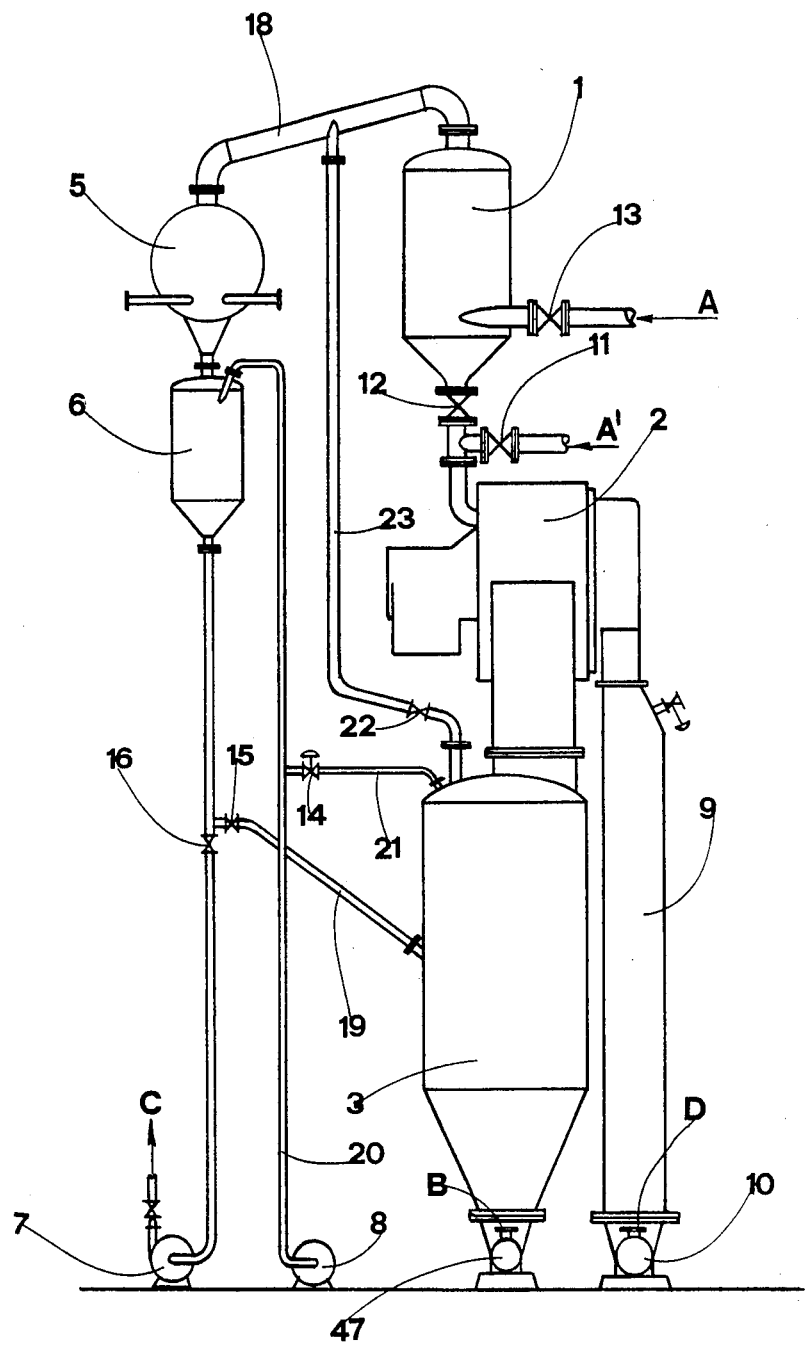

PROCESS FOR REFINING FOODSTUFFS

BACKGROUND OF THE INVENTION

The invention described herein relates to a process for refining foodstuffs, and to plant therefor.

Refining of foodstuffs is widespread in the food industry; fruit and vegetable produce provide a typical example, and meat processing is likewise a case in point. The refining process reduces such produce and products to juice, pulp, purée, paste etc. . . .

The machinery normally employed in refining processes of the type consists of a casing that accommodates a screen in the form of a grille or sieve, generally cylindrical or conical in shape, inside of which a shaft with vanes is made to rotate. The foodstuff is fed into the screen, and forced through to the outside by rotation of the vanes.

The product issuing from the screen, which most commonly will be the juice and the pulp of whatever produce is fed in, is collected and conveyed forward either to successive processing stages or to bottling or packaging stations, whereas waste matter such as the seeds and the peel of fruit, vegetables, or other market garden produce, are drawn off from the inside of the screen, usually by a continuous method.

A given granulometry selected for the end-product in process, fine or coarse as this may be, is obtained by using a number of machine stages arranged in series, each stage of which consists of a machine identical to the preceding machine, though with a screen having holes of smaller diameter, thereby decreasing in size stage by stage. Such machines are known to a person skilled in the art under a variety of names—viz, strainers, refiners, super-refiners, disintegrating mills of the hammer or colloid type, cutters etc., depending upon the granulometry they are capable of producing.

The end-products obtained by this method are generally used in the manufacture of fruit juice beverages, baby foods, preserves of various kinds, and where meat processing is concerned, in the preparation of pastes ultimately to be packed as sausage meat (wurst, mortadella . . .)

The processing methods in question subject foodstuffs to a mixing and beating action of energetic and prolonged nature, as a result of which a considerable quantity of air is entrained; this heightens the degenerative effects of oxidation on all the chemical constituents of the foodstuff. The general upshot is a deterioration of the organoleptic and nutritional properties of the end-product, and of its appearance—viz, the effects on color and vitamin content, the oxidation of fatty substances and the denaturation of amino acids and proteins, to name only the most notable of such adverse factors.

The main object of the invention described herein is that of overcoming the abovementioned drawbacks by providing a process and relative plant that will permit of achieving a marked improvement in the quality, as well as in the general properties, of food products manufactured by way of a process of the type in question.

SUMMARY OF THE INVENTION

The stated object, and other objects besides, can be realized with the process as disclosed and as claimed hereinafter, which comprises the steps of conveying foodstuff into a depressurized environment and refining it therein; of separating any waste matter and collecting the refined foodstuff within the depressurized environment; and of drawing off both the refined end-product and the separated waste matter from within the depressurized environment.

The stated object is likewise realized with plant as described and as claimed herein, comprising: a depressurized environment into which the foodstuff is conveyed and from which the refined end-product ultimately emerges, and inside of which conventional machine units are located that refine the foodstuff, separate any waste matter therefrom, and collect both the refined end-product and the waste matter; conventional means by which to create and maintain a prescribed negative pressure within the environment; conventional means by which to convey the foodstuff into the depressurized environment; first draw-off means of a conventional type for the removal of refined foodstuff from the depressurized environment; and second draw-off means of a conventional type for the removal of any waste matter from the depressurized environment.

BRIEF DESCRIPTION OF THE DRAWINGS

The process, together with a preferred embodiment of plant for its implementation, will now be described in detail by way of example in conjunction with the accompanying drawing, which is a schematic representation of the plant in vertical elevation.

DESCRIPTION OF THE PROCESS

The process to which the invention relates comprises a first step of conveying the foodstuff to be manufactured into a depressurized environment, whereupon refining of the foodstuff takes place within this same depressurized environment, that is, in a vacuum, to all intents and purposes.

The foodstuff is refined by traditional methods such as those, for example, whereby the produce or meat, or whatever, is introduced into a machine provided with a screen, and with a vaned rotor turning within the screen. the foodstuff is urged against the inner surface of the screen by the vanes of the rotor, and caused thus to issue from the screen in the form of juice, purée, or paste.

The fundamental aspect in which the process disclosed differs from conventional processes, is that refining takes place in a vacuum; in this way, the quantity of air entrained by the foodstuff can be reduced according to the degree of depressurization prescribed for the process. The result is that one obtains a remarkable improvement in the quality of the end-product.

A foodstuff may be refined by adopting one or more stages of machinery, depending on the granulometry effectively required; for example, one strainer only might by used, or a straining stage followed by a refining stage, perhaps a super-refining stage, and even a disintegrating stage thereafter, according to requirements.

The refined foodstuff is separated from any waste matter produced as a result of the refining process and collected within the depressurized environment, then drawn off and conveyed either to a further processing stage or to a bottling/packaging station.

When processing certain foodstuffs such as tomato, or fruit and vegetable produce generally, it may well be to advantage to include a preparatory cooling and de-aeration stage by inducing evaporation in a vacuum, so that vapors given off by the produce can be condensed and then drawn off from the depressurized environment. In the event of it being desirable that aromas, or other constituents extracted with the vapor during such evaporation, be retained ultimately in the end-product, the condensed vapor can be re-integrated with the foodstuff once refined.

According to the invention, the amount of air brought into contact with the foodstuff throughout the entire process is reduced according to the level of negative pressure produced; thus, the quality of refined end-products obtained by way of the process is decidedly superior to that obtainable with processes embraced by the prior art, and more precisely, considerable improvements are produced in terms of vitamin content and color, in the degree of oxidation of fatty substances and in the extent to which amino acids and proteins are denatured, and in the organoleptic and nutritional properties and appearance of the end-product.

DESCRIPTION OF THE PREFERRED EMBODIMENT

In the embodiment of the plant shown in the drawing, 2 denotes a sealed machine casing that houses screens and rotors of a conventional type for the purpose of refining the foodstuff. A given plant might comprise a number of such casings 2 installed in series or in parallel, each of which containing respective screens and rotors. Alternatively, a single casing might be installed which houses a multi-stage machine.

3 denotes a collection tank, located beneath the casing 2, in which the refined foodstuff accumulates; 9 denotes a further tank positioned therealongside, serving to collect any waste matter produced by the refining process brought about inside the machine casing 2.

The foodstuff may either by conveyed into the machine casing 2 in direct fashion, via the inlet denoted A′, or indirectly via the inlet denoted A. In the latter instance, the foodstuff is held initially in a tank 1 in order that it may undergo preparatory de-aeration and/or evaporation before discharging from the tank 1 and flowing into the refining machine casing 2.

11, 12 and 13 denote shut-off valves which open up or block the inlets A and A′ according to requirements.

A pipeline 18 connecting with the top of the evaporation tank 1 carries vapor and gases away into a condenser 5; this is a surface type in the drawing, but could be of any given design, naturally enough. The condensate flows into a keep tank 6, from which it can be removed by third draw-off means consisting of a pump 7. Where a different design of condenser is employed, the draw-off means, accordingly, will be of a suitable type for that design.

For these cases where the condensate contains aromas or constituents that it is desirable to retain in the end-product, plant according to the invention comprises a recycle line 19 which permits of directing the condensate from the keep tank 6 back into the collection tank 3 containing the refined foodstuff. Likewise in this case one has shut-off valves 15 and 16 that serve to direct flow of the condensate either to the pump 7 or into the collection tank 3, respectively.

The four tanks 1, 3, 9 and 6, the machine casing 2, the condenser 5, and all the interconnecting pipework create an air/fluid-tight environment inside which is prescribed negative pressure can be maintained.

Notwithstanding the description and drawing disclose plant in which the above component parts are embodied separately, each with its respective outer casing, a person skilled in the art will appreciate that a traditional type of embodiment could equally well be adopted, with such parts housed in one large and appropriately depressurized enclosure.

8 denotes means, embodied as a pump, by which the prescribed degree of negative pressure is created and maintained in the depressurized environment described above. The pump 8 generates negative pressure through a first line 20, thence throughout the entire system. In the case of a foodstuff being conveyed in via the inlet denoted A′, the evaporation tank 1 can be by-passed completely by shutting off the relative valve 12; in this instance, the environment will be depressurized by way of a second line 21 and a third line 23, opened up with further valves 14 and 22. Any vapors that may be given off during the process are carried away to the condenser via the third line 23, which runs from the collection tank 3 into the line denoted 18.

47 denotes first draw-off means, embodied as a pump, for the purpose of removing refined foodstuff from the system via the outlet denoted B.

Lastly, second draw-off means are provided, embodied likewise as a pump 10, which carry away waste matter accumulated in the relative tank 9, via the outlet denoted D.

Plant embodied as in the above specification duly permits implementation of the process claimed herein, which is suitable, it will be remembered, for refining fruit, vegetable, and market garden produce of any given type, as well as meats and other similar foodstuffs, by reducing the amount of air brought into contact with the foodstuff according to the degree of negative pressure generated in the system.

What is claimed:

1. A process for refining foodstuff comprising the steps of:
   conveying an unrefined foodstuff into a depressurized environment;
   refining said unrefined foodstuff within said depressurized environment by refining means so as to produce a refined foodstuff having a consistency different from the consistency of said unrefined foodstuff;
   separating any remaining unrefined foodstuff from said refined foodstuff within said depressurized environment;
   collecting said refined foodstuff within said depressurized environment; and
   separately drawing off said refined foodstuff and said separated unrefined foodstuff from within said depressurized environment.

2. The process recited in claim 1, wherein said refining means comprises single or multi-stage machines having vaned rotors.

3. The process recited in claim 1, further comprising the steps of:
   cooling and de-aerating said unrefined foodstuff by means of evaporation within said depressurized environment so as to produce vapors, said cooling and de-aerating step being performed prior to said refining step;
   condensing said vapors to produce condensate; and,
   drawing off said condensate from within said depressurized environment.

4. The process recited in claim 3, further comprising the step of reintegrating said condensate with said refined foodstuff subsequent to said refining step.

* * * * *